(12) United States Patent
Domm

(10) Patent No.: US 8,922,899 B2
(45) Date of Patent: Dec. 30, 2014

(54) LIGHT COMBINING SYSTEM

(71) Applicant: Christie Digital Systems Canada Inc., Kitchener (CA)

(72) Inventor: John Domm, Kitchener (CA)

(73) Assignee: Christie Digital Systems USA, Inc., Cypress, CA (US)

( * ) Notice: Subject to any disclaimer, the term of this patent is extended or adjusted under 35 U.S.C. 154(b) by 0 days.

(21) Appl. No.: 13/658,871

(22) Filed: Oct. 24, 2012

(65) Prior Publication Data

US 2014/0111867 A1 Apr. 24, 2014

(51) Int. Cl.
*G02B 27/14* (2006.01)
*G02B 27/12* (2006.01)
*G02B 27/10* (2006.01)

(52) U.S. Cl.
CPC .......... *G02B 27/145* (2013.01); *G02B 27/1013* (2013.01)
USPC .......................................... 359/638; 359/640

(58) Field of Classification Search
CPC . G02B 27/1013; G02B 27/126; G02B 27/145
USPC ................................................. 359/638, 640
See application file for complete search history.

(56) References Cited

U.S. PATENT DOCUMENTS

| | | | |
|---|---|---|---|
| 5,552,922 A | 9/1996 | Magarill | |
| 6,349,006 B1 | 2/2002 | Okamori et al. | |
| 6,644,813 B1 | 11/2003 | Bowron | |
| 6,908,197 B2 | 6/2005 | Penn | |
| 2004/0080718 A1* | 4/2004 | Kojima | ........................ 353/55 |
| 2010/0149626 A1 | 6/2010 | Penn | |
| 2010/0238413 A1 | 9/2010 | Huang | |
| 2010/0315596 A1 | 12/2010 | Yoon | |

FOREIGN PATENT DOCUMENTS

EP 1398973 A2 3/2004

OTHER PUBLICATIONS

Corresponding European Patent Application No. 13189922.1 Search Report dated Jan. 22, 2014.

* cited by examiner

*Primary Examiner* — William Choi
(74) *Attorney, Agent, or Firm* — Perry + Currier Inc.

(57) ABSTRACT

A light combining system is provided comprising: prisms comprising respective entrance faces enabled to receive respective on-state light from respective digital-micro-mirror devices (DMD). At least one interface between prisms is enabled to receive respective on-state light from the prisms. A mirror at the at least one interface is enabled to transmit first on-state light from a first prism through a second prism and reflect second on-state light from the second prism in alignment with the first on-state light back through the second prism. Respective angles formed by a normal of the mirror and each of the first on-state light and the second on-state light is less than a total internal reflection angle. A combination of respective back working distances of the DMDs and shapes of each of the prisms is chosen such that respective illumination paths and respective reflection paths of each of DMDs do not interfere with each other.

16 Claims, 9 Drawing Sheets

LIGHT COMBINING SYSTEM

FIELD

The specification relates generally to projection systems, and specifically to a light combining system.

BACKGROUND

Prisms for combining light in projection systems have illumination and off-state light paths internal to prism, as well as total internal reflection ("TIR") surfaces. Also, current off-state light hits the sides of the prisms. These three scatter sources increase the chance of light scatter and therefore reduce the upper limit of contrast ratio of projector systems. While dichroic plates could be used in place of the prisms, the dichroic plates need to be very thin, as well as optically flat, so they do not introduce optical aberrations to the projection optical path.

SUMMARY

An aspect of the specification provides a light combining system comprising: a first prism comprising a first entrance face enabled to receive first on-state light from a first DMD (digital micromirror device); a second prism comprising a second entrance face enabled to receive second on-state light from a second DMD; at least one interface between the first prism and the second prism enabled to receive the first on-state light and the second on-state light; a mirror at the at least one interface, enabled to transmit the first on-state light through the second prism and reflect the second on-state light in alignment with the first on-state light back through the second prism, each of respective angles formed by a normal of the mirror and each of the first on-state light and the second on-state light being less than a total internal reflection angle; a combination of respective back working distances of the first DMD and the second DMD and respective shapes of each of the first prism and the second prism chosen such that respective illumination paths and respective reflection paths of each of the first DMD and the second DMD do not interfere with each other.

The first entrance face can be about perpendicular to a first center-path of the first on-state light, the second entrance face can be about perpendicular to a second centre-path of the second on-state light and an exit face of the second prism can be about perpendicular to the first center-path.

Respective further angles between the mirror and each of the first entrance face and the second entrance face can each be less than the total internal reflection angle.

Each of the first on-state light and the second on-state light can comprise cones, and the respective angles formed by the normal of the mirror and edges of each of the cones can each be less than the total internal reflection angle.

The light combining system can further comprise an air-gap between the first prism and the second prism, the at least one interface at the air-gap. The light combining system can further comprise a harness enabled to hold the first prism and the second prism to maintain a distance of the air-gap. The light combining system can further comprise one or more spacers between the first prism and the second prism to maintain a distance of the air-gap.

The light combining system can further comprise an optical epoxy between the first prism and the second prism.

The mirror can comprise one or more of a coating on the at least one interface and a dichroic mirror.

Faces of the first prism and the second prism through which the first on-state light and the second on-state light travel through, other than the at least one interface, can be coated with respective antireflective coatings.

The light combining system can further comprise the first DMD and the second DMD.

The light combining system can further comprise projection optics enabled to receive the first on-state light and the second on-state light when the first on-state light and the second on-state light exit the second prism.

The light combining system can further comprise respective light dumps for absorbing the respective off-state light of the first DMD and the second DMD.

At least one of the respective shapes of the first prism and the second prism can be triangular in cross-section.

The light combining system can further comprise at least one spacing prism between the first prism and the second prism.

The light combining system can further comprise: a third prism comprising a third entrance face enabled to receive third on-state light from a third DMD; at least one second interface between the second prism and the third prism enabled to receive aligned first and second on-state light and the third on-state light; a second mirror at the at least one second interface, enabled to transmit the aligned first and second on-state light through the third prism and reflect the third on-state light in alignment with the aligned first and second on-state light back through the third prism, each of respective angles formed by a normal of the second mirror and each of the aligned first and second on-state light and the third on-state light being less than the total internal reflection angle; a combination of the respective back working distances of the first DMD, the second DMD and the third DMD and the respective shapes of each of the first prism, the second prism and the third prism chosen such that the respective off-state paths and the respective illumination paths and the respective reflection paths of each of the first DMD, the second DMD and the third DMD do not interfere with each other.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
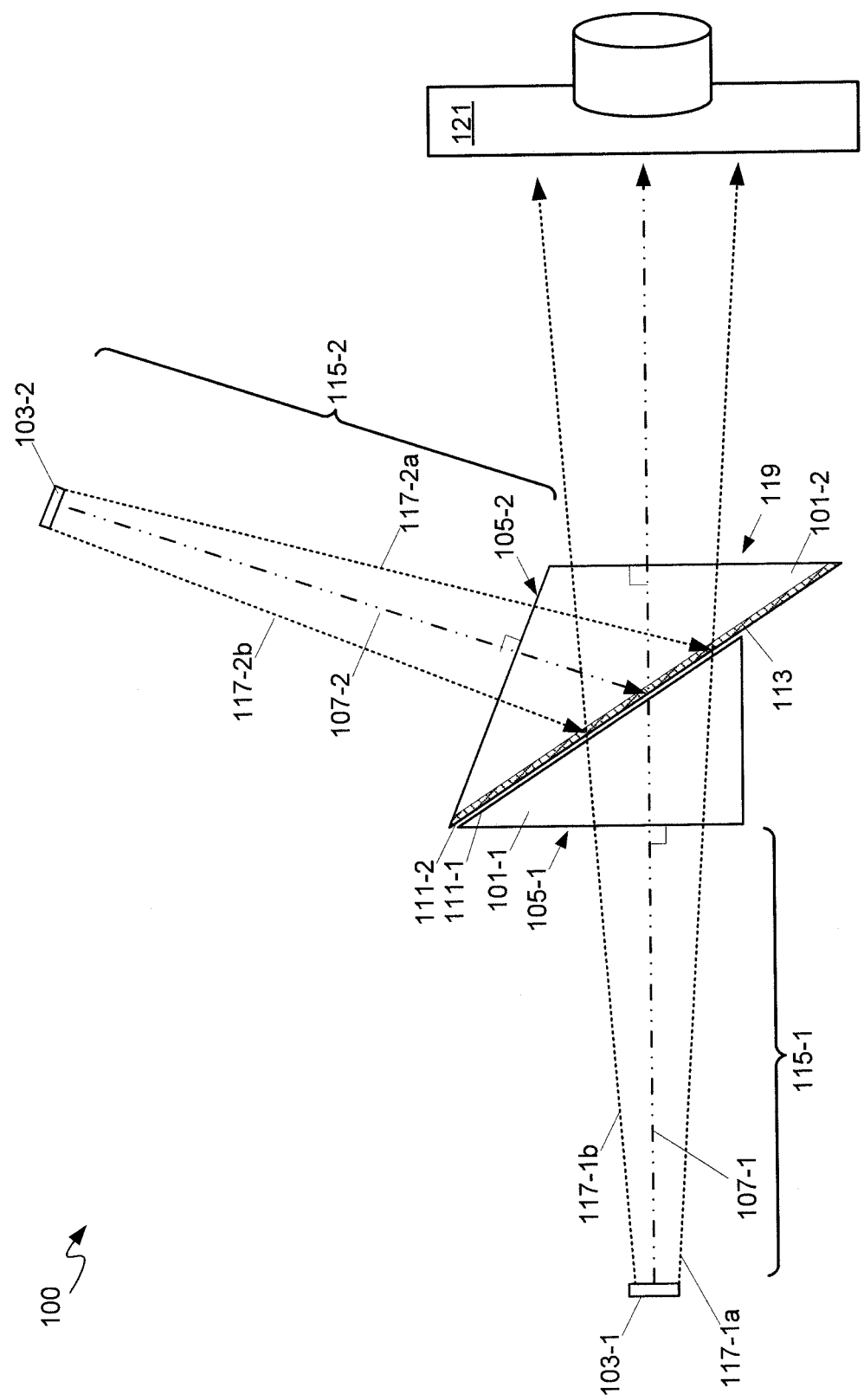
FIG. 1 depicts a light combining system, according to non-limiting implementations.

FIG. 1 depicts a light combining system 100, according to non-limiting implementations. The light combining system 100, also referred to interchangeably hereafter as system 100, comprises: a first prism 101-1, a second prism 101-2, a first digital micromirror device (DMD) 103-1, and a second DMD 103-2. First prism 101-1 is enabled to receive first on-state light from first DMD 103-1 at a first entrance face 105-1. In depicted implementations, first entrance face 105-1 is perpendicular to a first center-path 107-1 of the first on-state light, however in other implementations first entrance face 105-1 can be off-perpendicular from first center-path 107-1. Second prism 101-1 is enabled to receiving second on-state light from second DMD 103-2 at a second entrance face 105-2. In depicted implementations, second entrance face 105-2 is perpendicular to a second center-path 107-2 of the first on-state light, however in other implementations second entrance face 105-2 can be off-perpendicular from second center-path 107-2.

System 100 further comprises at least one interface 111-1, 111-2 between first prism 101-1 and second prism 101-2 for receiving the first on-state light and the second on-state light. It is appreciated that the one or more interfaces 111-1, 111-2 are on the first center-path 107-1 and second center-path 107-2: prism 101-1 comprising first interface 111-1, and first interface 111-1 comprising a face opposite entrance face 105-1; and prism 101-2 comprising second interface 111-2, and second interface 111-2 comprising a face opposite entrance face 105-2. For example, one of interfaces 111-1, 111-2 can be located at about where first center-path 107-1 and second center-path 107-2 intersect while the other of interfaces 111-1, 111-2 can be located at an opposite of a gap between interfaces 111-1, 111-2.

System 100 further comprises a mirror 113 at one or more of interfaces 111-1, 111-2, mirror 113 enabled to transmit the first on-state light through second prism 101-2 along first center-path 107-1 and reflect the second on-state light along first center-path 107-1 through second prism 101-2 in alignment with the first on-state light. Each of respective angles formed by a normal of mirror 113 and each of the first on-state light and the second on-state light being less than a total internal reflection angle.

Further, a combination of respective back working distances 115-1, 115-2 of first DMD 103-1 and second DMD 103-2 and respective shapes of each of first prism 101-1 and second prism 101-2 are chosen such that respective off-state paths and respective illumination paths of each of first DMD 103-1 and second DMD 103-2 clear first prism 101-1 and second prism 101-2, and/or do not interfere with each other, as described below with respect to FIG. 3.

Hence, system 100 comprises: first prism 101-1 comprising first entrance face 105-1 enabled to receive first on-state light from first DMD 103-1; second prism 101-2 comprising second entrance face 105-2 enabled to receive second on-state light from second DMD 103-2; at least one interface 111-1, 111-2 between first prism 101-1 and second prism 101-2 for receiving the first on-state light and the second on-state light; mirror 113 at the at least one interface 111-1, 111-2, enabled to transmit the first on-state light through second prism 101-2 and reflect the second on-state light in alignment with the first on-state light back through second prism 101-2, each of respective angles formed by a normal of mirror 113 and each of the first on-state light and the second on-state light being less than a total internal reflection angle; and, a combination of respective back working distances of first DMD 103-1 and second DMD 103-2 and respective shapes of each of first prism 101-1 and second prism 101-2 chosen such that respective illumination paths and respective reflection paths of each of first DMD 103-1 and the second DMD 103-2 do not interfere with each other First prism 101-1 and second prism 101-2 will also be referred to hereafter collectively as prisms 101 and generically as a prism 101. First DMD 103-1 and second DMD 103-2 will also be referred to hereafter collectively as DMDs 103 and generically as a DMD 103. First entrance face 105-1 and second entrance face 105-2 will also be referred to hereafter collectively as entrance faces 105 and generically as an entrance face 105. First center-path 107-1 and second center-path 107-2 will also be referred to hereafter collectively as paths 107 and generically as a center-path 107. Interfaces 111-1, 111-2 will also be referred to hereafter collectively as interfaces 111 and generically as an interface 111. Back working distances 115-1, 115-2 will also be referred to hereafter collectively as back working distances 115 and generically as a back working distance 115.

Each of prisms 101 can comprise any suitable material, including but not limited to one or more of glass, high-temperature glass, Pyrex™ and the like. It is further appreciated that each of prisms 101 comprises an index of refraction, for example about 1.5.

It is further appreciated that each DMD 103 reflects on-state light along a respective center-path 107 thereby forming a respective component of an image, and that prisms 101 combine on-state light from each DMD 103 such that the on-state light is combined into an image, which can then be projected. Further, while FIG. 1 is two-dimensional, each DMD 103 reflects on-state light along a respective center-path 107 with a three-dimensional conical shape and/or an etendue and/or an f-number. For example, paths 117-1a, 117-1b are indicative of edges of a cone of on-state light reflected from first DMD 103-1 and paths 117-2a, 117-2b are indicative of edges of a cone of on-state light reflected from second DMD 103-2. Paths 117-1a. 117-1b, 117-2a, 117-2b 2 will also be referred to hereafter collectively as paths 117 and generically as a path 117. It is appreciated that the respective angles formed by a normal of mirror 113 and each of paths 117 are also less than a total internal reflection angle, such that on-state light of each cone of light is not reflected internal to either of first prism 101-1 and second prism 101-2.

From FIG. 1, it is also appreciated that back working distances 115 are such that: path 117-2a intersects path 117-1a and hence light from second DMD 103-2 along path 117-2a is reflected from mirror 113 along path 117-1a; and, similarly, path 117-2b intersects path 117-1b and hence light from second DMD 103-2 along path 117-2b is reflected from mirror 113 along path 117-1b. However, back working distances 115 are chosen such that respective illumination paths of DMDs 103 do not interfere with respective reflectance paths 107, 117. In other words, illumination light should clear prisms 101 and not interfere with light reflected from DMDs 103. This is described in more detail below with reference to FIG. 3.

It is further appreciated that mirror 113 can comprise a dichroic mirror enabled to transmit on-state light from first DMD 103-1 and reflect on-state light from DMD 103-2. In other words, mirror 113 comprises a coating on at least one of interfaces 111. For example, on-state light from each DMD 103 are generally in different wavelength ranges, and hence mirror 113 is enabled to transmit light in a first wavelength range associated with DMD 103-1 and reflect light in a second wavelength range associated with DMD 103-2, the second wavelength range different from the first wavelength range.

Further, the dichroic mirror can be designed to transmit on-state light from first DMD 103-1 and reflect on-state light from DMD 103-2 at respective angles formed by paths 107 and a normal of mirror 113 and/or at respective angles formed by paths 117 and a normal of mirror 113, as described in further detail below with respect to FIG. 4.

It is yet further appreciated that, while in depicted implementations, mirror 113 is located at interface 111-2 of second prism 101-2, in other implementations mirror 113 can be located at interface 111-1 of first prism 101-1. In other words, mirror 113 can be located at one or more of interfaces 111. Indeed, in some implementations, system 100 can comprise two mirrors, each at one of interfaces 111, each enabled to transmit light in a first wavelength range associated with DMD 103-1 and reflect light in a second wavelength range associated with DMD 103-2.

It is further appreciated that an exit face 119 of second prism 101-2 is perpendicular to first center-path 107-1 to reduce internal reflection from exit face 119. However, in other implementations, exit face 119 can be off-perpendicular. However, ins some implementations, to reduce internal reflection within prisms 101, entrance faces 105 being perpendicular to respective paths 107, and exit face 119 being perpendicular to center-path 107-1 can each be considered a design rule, but is not to be considered limiting.

It is yet further appreciated that each of entrance faces 105 and exit face 119 can be coated with respective anti-reflective coatings, as well as at interfaces 111 that are not coated with mirror 113. When entrance faces 105, and exit faces 119 is off-perpendicular to respective paths 107, and exit face 119 is off-perpendicular to center-path 107-1, the respective anti-reflective coatings can be optimized for transmission at the angles of incidence of light onto entrance faces 105 and exit face 119.

In non-limiting implementations where one or more entrances faces 105 and exit face 119 is off-perpendicular, the off perpendicular faces 105, 119 can be one or more of in a range of about 0° to about 10° off-perpendicular from respective paths 107 and in a range of about 0° to about 200 off-perpendicular from respective paths 107. Indeed, in yet further implementations, the off perpendicular faces 105, 119 can be greater than about 20°. However, it is appreciated that the more a face 105, 119 is off-perpendicular from respective path 107, the more challenging it can be to compensate using any-reflection coatings of faces 105, 119. Indeed, faces 105, 119 are preferably about perpendicular to respective paths to reduce the possibility of stray reflections and scatter in system 100.

System 100, as depicted in FIG. 1, further comprises an air-gap between prisms 101, interfaces 111 at the air-gap. In some implementations, system 100 can further comprise a harness (not depicted), and the like, for holding prisms 101 to maintain a distance between prisms 101 at interfaces 111. For example, such a harness could comprise one or more spacers that fit between prisms 101, the spacers being at a same thickness of the air-gap to maintain the distance between prisms 101 at interfaces 111.

Alternatively, system 100 could comprise an optical epoxy (not depicted), and the like, between prisms 101 at interfaces 111. However, as system 100 is generally used in projection systems, and light from DMDs 103 can be very intense, an optical epoxy that can withstand the intensity and heat of the light of the projection system over an expected life of the projection system is generally selected.

System 100 can further comprise projection optics 121, including but not limited to a projection lens, projection optics 121 enabled to receive the first on-state light and the second on-state light along first center-path 107-1 when the first on-state light and the second on-state light exit second prism 101-2. Projection optics 121 can project the image formed by the combined on-state light, for example onto a screen (not depicted). Further, as the on-state light is generally conical, projection optics 121 is generally enabled to receive the cone of the on-state light.

In depicted implementations, at least one of the respective shapes of prisms 101 is triangular in cross-section. In particular, triangular cross-section prisms are relatively easy to polish to achieve flat faces. However, in other implementations, to reduce an amount of material of a prism 101, one or more of prisms 101 need not be triangular in cross-section, however polishing can be challenging. In any event, polishing prism faces is both cheaper and less challenging than polishing dichroic plates, as with prior art solutions.

Figure 2:
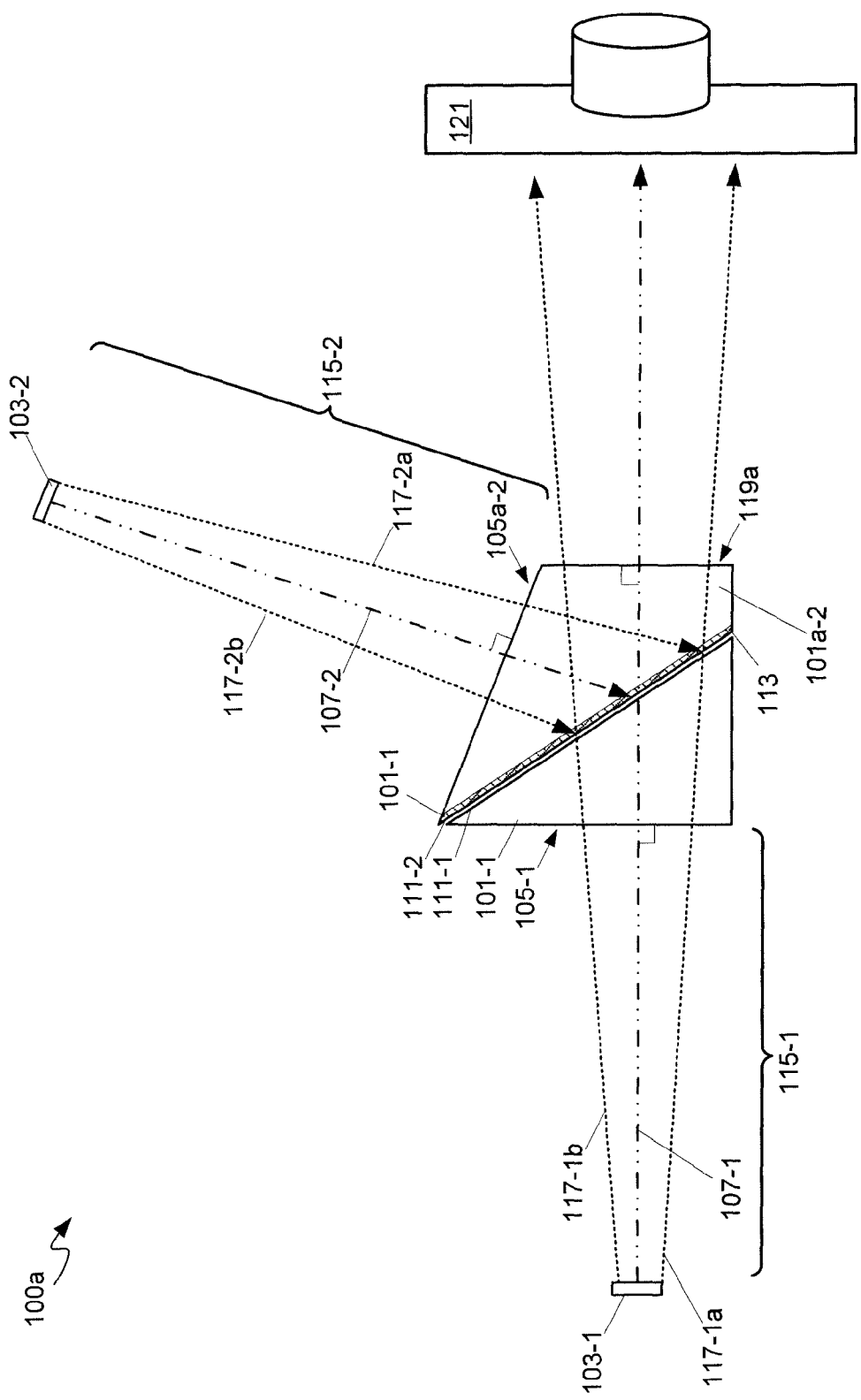
FIG. 2 depicts a light combining system, according to non-limiting implementations.

For example, attention is directed to FIG. 2 which depicts a system 100a that is substantially similar to system 100, with like elements having like numbers, however prism 101-2 has been replaced with prism 101a-2, comprising an entrance face 105a-2 and an exit face 119a, each respectively similar to entrance face 105-2 and exit face 119. However, prism 101a-2 is quadrilateral in cross-section, with dimensions of prism 101a-2 being substantially similar to dimensions of prism 101-2, however with a bottom portion (relative to prism 101-2 of FIG. 1) removed and/or absent, as no light is transmitted via the bottom portion. Indeed, it is appreciated that any portions of a prism 101 through which light is not transmitted is generally superfluous and can be omitted. However, while this can reduce both a size of a prisms 101 and an amount of material in a prism 101, complex shapes can result, which can be more challenging to polish than prisms of triangular cross-section.

Figure 3:
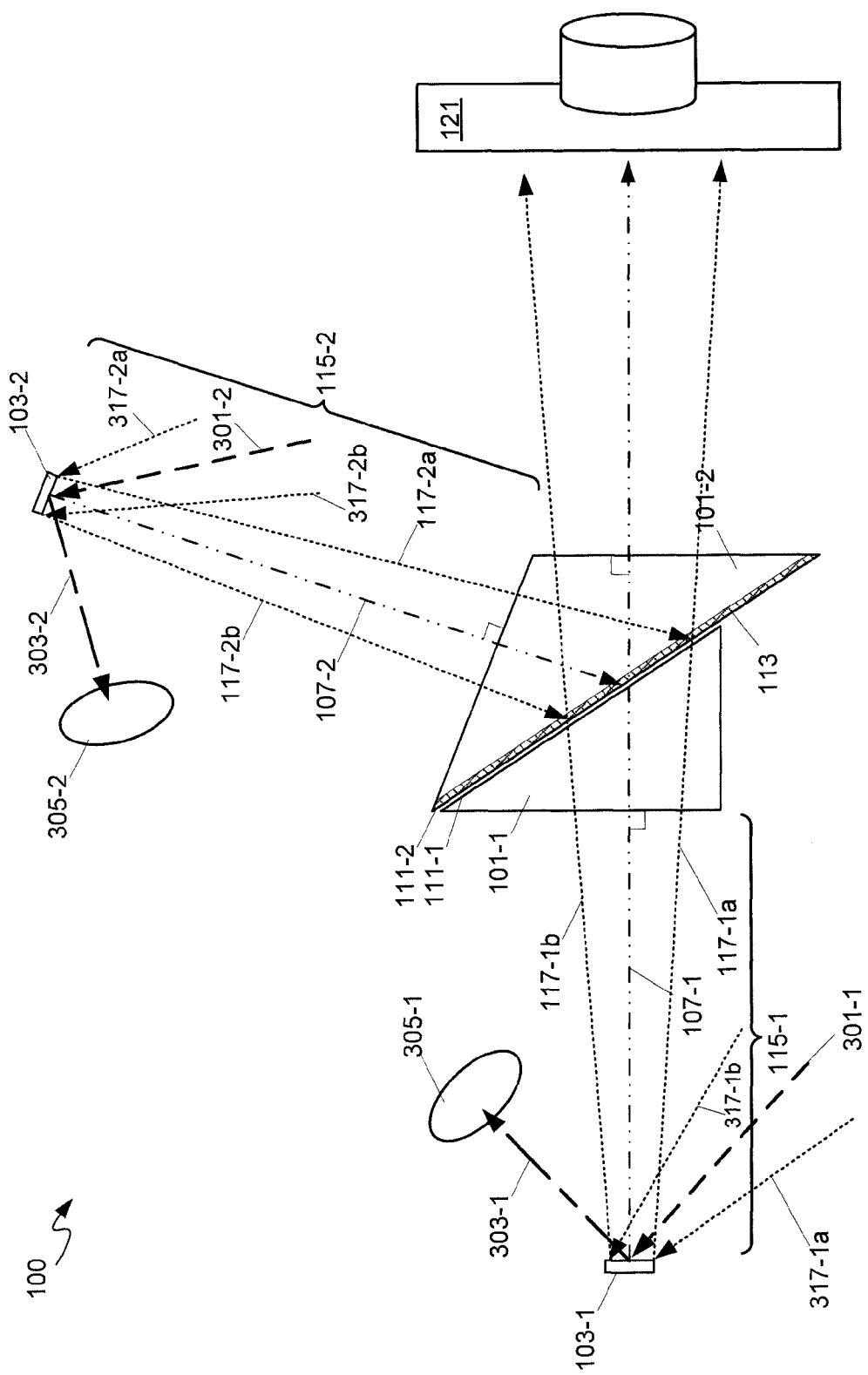
FIG. 3 depicts the light combining system of FIG. 1, showing further elements, according to non-limiting implementations.

Attention is next directed to FIG. 3 which depicts further aspects of system 100, and illustrates further design rules of present implementations. While not all elements of system 100, as depicted in FIG. 1, are depicted and/or numbered for clarity, it is appreciated that they are nonetheless present. In any event, FIG. 3 further depicts respective illumination paths 301-1, 317-1a, 317-1b, 301-2, 317-2a, 317-2b of DMDs 103 and respective off-state paths 303-1, 303-2 of DMDs 103 (illumination paths 301-1, 301-2 will also be referred to hereafter collectively as illumination paths 301 and generically as an illumination path 301; further illumination paths 317-1a, 317-1b, 317-2a, 317-2b will also be referred to hereafter collectively as illumination paths 317 and generically as an illumination path 317; further, off-state paths 303-1, 303-2 will also be referred to hereafter collectively as off-state paths 303 and generically as an off-state path 303). It is further appreciated that paths 317 are indicative of respective edges of cones of illumination light incident to DMDs 103 along path 301. While off-state light travelling along paths 303 are also cones, the edges of reflected off-state cones are not depicted for clarity, but are appreciated to be nonetheless present.

In any event, it is appreciated that each micromirror of each DMD 103 comprises an on-state and an off-state and pivots there between depending on whether an associated pixel is on or off, as controlled by an image generator and the like.

Further, a respective light source (not depicted) in a given wavelength range, illuminates a given DMD 103 along a respective illumination path 301 and when respective micromirrors are in an on-state, on-state light is reflected along a respective on-state center-path 107; similarly, when respective micromirrors are in an off-state, off-state light is reflected along a respective off-state path 303.

In any event, as indicated above, a combination of respective back working distances 115 of DMDs 103, and respective shapes of each prism 101 are chosen such that respective illumination paths 301, 317 of each DMD 103 clear prisms 101 and further chosen such that respective illumination paths 301, 317 do not interfere with reflection paths 107, 117. In other words, none of paths 301, 317 intersect prisms 101 not interfere with paths 107, 117. It is further appreciated that none of paths 303 intersect prisms 101.

Indeed, it is appreciated that illumination light not interfering with reflected light, in conjunction with given back working distances 115, can be considered a further design rule of present implementations.

Further, while FIG. 3 depicts back working distances 115 that are relatively large, back working distances 115 in working projection systems can range from about 50 mm to about 150 mm. However the back working distance can be dependent on a size of a DMD 103, and an f-number of illumination light (i.e. a cone of illumination light should clear prisms 101). Indeed, a minimum back working distance can be determined by the smallest back working distance needed for illumination light to clear prisms 101, and illuminate a DMD 103, as well as to not interfere with light reflected along paths 107. 117 (i.e. the cones of each of illumination light and light reflected on paths 107, 117 do not interfere). A maximum back working distance can be determined by the physical constraints of a housing (not depicted) of system 100, and/or a size of a spot formed by light reflected by a DMD along a center-path 107: in other words such a spot will increase with back working distance 115 and should be at least within an area of a respective entrance face 105. In a successful prototype, back working distances 115 were about 115 mm. Hence dimensions are much tighter in implemented systems than in example depicted systems. Further, the shape of each of prisms 101 can depend on a back working distance 115, as well as paths 107, 301, 303, and paths of cones associated therewith and/or an etendue of one or more of illumination light, off-state light, and on-state light. In general, back working distances 115 can be minimized in order to minimize space usage in system 100 (and/or system 100*a*) when designing light combining systems of present implementations.

It is further appreciated that respective sizes of each of faces 105, interfaces 111, and exit face 119 are commensurate with an etendue/conical shape of on-state light such that all on-state light enters and exits prisms 101. In other words, respective sizes of each of faces 105, interfaces 111, and exit face 119 are at least as large as a cross-section of an associated cone of on-state light when the cone enters/exits faces 105, interfaces 111, and exit face 119. It is appreciated that such sizes faces 105, interfaces 111, and exit face 119 can be considered a further design rule of present implementations.

As further depicted in FIG. 3, system 100 can further comprise respective light dumps 305-1, 305-2 for absorbing the respective off-state light of each DMD 103, also referred to hereafter, collectively, as light dumps 305 and generically as a light dump 305. Each light dump 305 is located along an off-state path 303.

Figure 4:
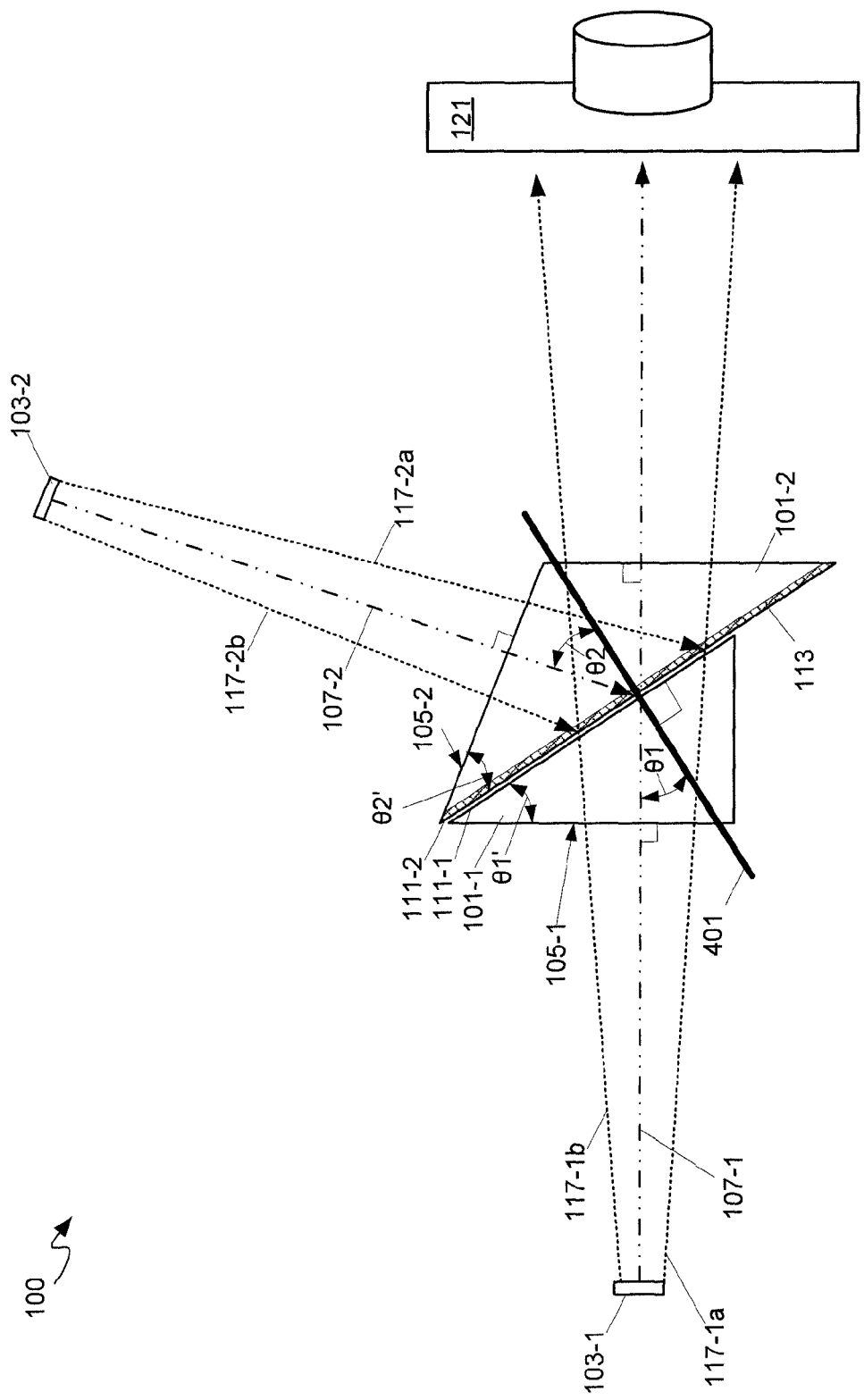
FIG. 4 depicts the light combining system of FIG. 1, illustrating geometric relationships between elements, according to non-limiting implementations.

Attention is next directed to FIG. 4 which depicts further aspects of system 100, as well as further design rules of present implementations. While not all elements of system 100 are depicted and/or numbered for clarity, it is appreciated that they are nonetheless present. In any event, FIG. 4 further depicts a normal 401 to mirror 113. Each of angles θ1, θ2 formed respectively by normal 401 of mirror 113 and each of first center-path 107-1 and second center-path 107-2 are less than a total internal reflection angle of each of respective prisms 101: however, when each of prisms 101 comprise the same material, the total internal reflection angle for each is the same.

It is further appreciated that the angle θ1' formed by interface 111-1 and entrance face 105-1 is similar to angle θ1, and the angle θ2' formed by interface 111-2 and entrance face 105-2 is similar to angle θ2, presuming each of interfaces 111 are parallel to mirror 113, and entrance faces 105 perpendicular to respective center-paths 107. Hence, in these implementations, angle θ1' formed by interface 111-1 and entrance face 105-1 is also less than a total internal reflection angle, and angle θ2' formed by interface 111-2 and entrance face 105-2 is also less than a total internal reflection angle.

However, it is appreciated that interface 111-1 (i.e. the interface 111 where mirror 113 is not located) does not need to be parallel with mirror 113 and/or interface 111-2. On the other hand interface 111-1 being parallel with mirror 113 and/or interface 111-2 serves to reduce internal reflection in system 100, When system 100 comprises an air-gap between prisms 101, the total internal reflection angle of each of prisms 101 can be about 42°, hence each of angles θ1, θ2, θ1', θ2' is less than about 42°, presuming each of prisms 101 comprises glass having an index of refraction about 1.5. However, the angle of 42° is not to be considered particularly limiting and is dependent on the index of refraction of prisms 101; indeed any total internal reflection angle is within the scope of present implementations. It is appreciated that when the index of refraction of prisms 101 is different from 1.5, the total internal reflection angle is different from about 42°, and limits on angles θ1, θ2, θ1', θ2' can be adjusted accordingly.

It is further appreciated that an angle between normal 401 and each of paths 117 is also less than the total internal reflection angle such that no on-state light of edges of cones of on-state light are internally reflected. However, again assuming prisms 101 have an index of refraction of about 1.5, for an angle between normal 401 and each of paths 117 to be less than about 42°, each of angles θ1, θ2 can be about 35°.

Specifically, as each of paths 117-1*a*, 117-2*a* are at a larger angle than paths 107 with respect to normal 401, the size of angles θ1, θ2, θ1', θ2' can be such that respective angles between normal 401 and paths 117-1*a*, 117-2*a* are less than the total internal reflection angle, or about 42° when prisms 101 have an index of refraction of about 1.5.

Indeed, the angle between each of paths 117-1*a*, 117-2*a* and a normal of mirror 113 can be used to determine angles θ1, θ2, θ1', θ2'. Further, the angle between each of paths 117-1*a*, 117-2*a* and a normal of mirror 113 generally further depends on a cone angle and/or an etendue angle and/or an f-number of on-state light; in other words, the large the cone angle, the large angles θ1', θ2' to ensure that on-state travelling along paths 117-1*a*, 117-2*a* to ensure that it is not subject to total internal reflection.

From FIG. 4, it is further appreciated that an angle θ2' between interfaces 111 and entrance face 105-2 is such that on-state light travelling along center-path 107-2 is reflected along center-path 107-1 through second prism 101-2 (i.e. angle of incidence equals angle of reflection), presuming entrance face 105-2 is perpendicular to center-path 107-2.

Heretofore, light combining systems 100, 100a comprising only two DMDs 103 have been described, such that light from two different light sources can be combined. Such systems 100, 100a can include, but are not limited to, two DMD projection systems, where one of the DMDs alternatively reflects one of two different colours (e.g. red and blue), and the other DMD reflects one colour (e.g. green), and the like. However, present implementations are not so limited and indeed systems 100, 100a can be adapted to include at least a third DMD 103.

Figure 5:
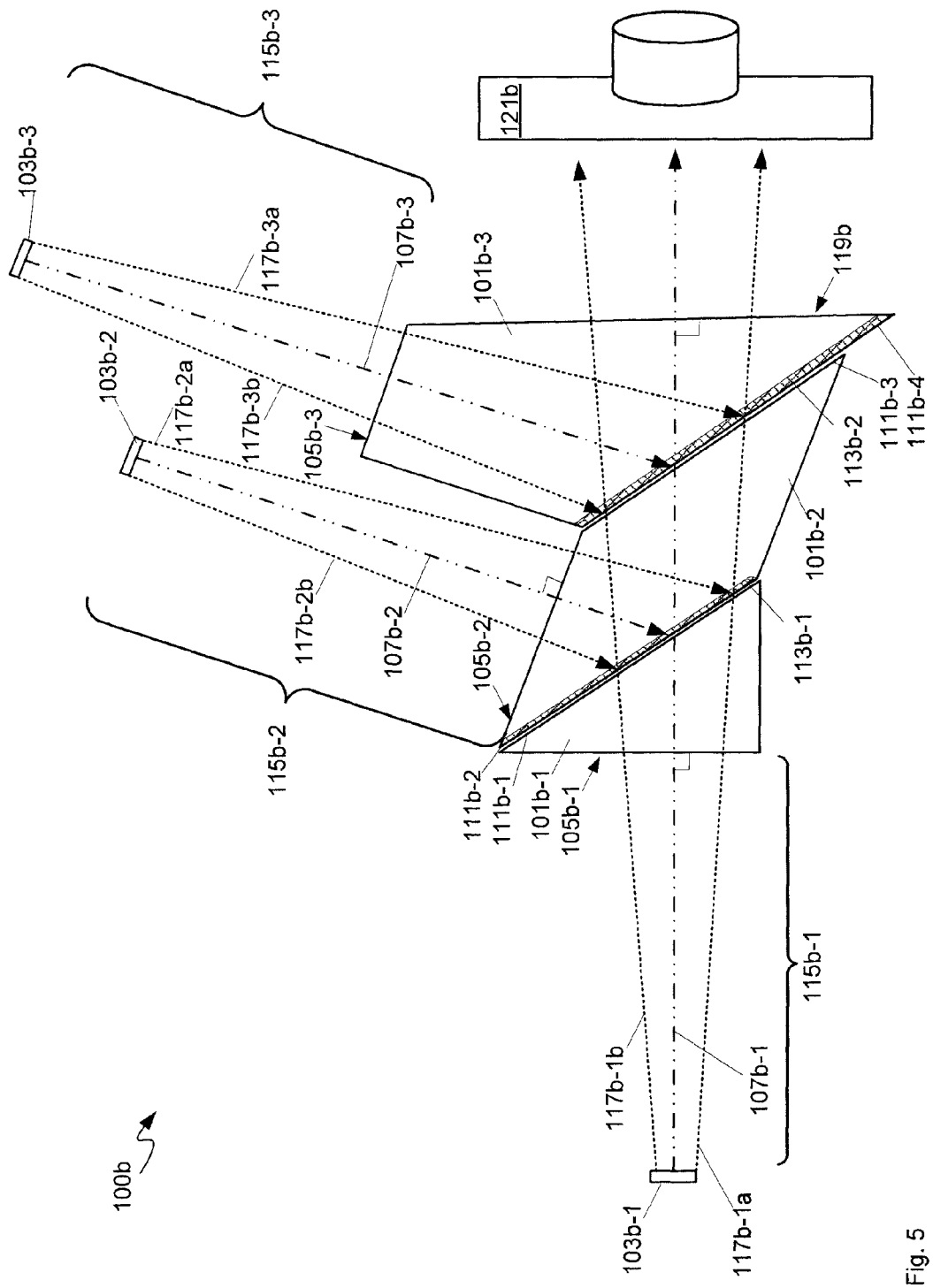
FIG. 5 depicts a light combining system with three digital micromirror devices, according to non-limiting implementations.

For example, attention is next directed to FIG. 5, which depicts a system 100b, which is substantially similar to system 100, with like elements having like numbers, but with a "b" appended thereto. However, system 100b comprises a third prism 101b-3 and a corresponding third DMD 103b-3 such that light from three different light sources can be combined. Hence, like system 100, system 100b comprises: a first prism 101b-1, a second prism 101b-2, a first DMD 103b-1, and a second DMD 103b-2. First prism 101b-1 comprises a first entrance face 105b-1 that is perpendicular to a first center-path 107b-1 of first on-state light. Second prism 101b-2 comprises a second entrance face 105b-2 that is perpendicular to a second center-path 107b-2 of second on-state light. First prism 101b-1 comprises an interface 111b-1 similar to interface 111-1, and second prism 101b-2 comprises an interface 111b-2 similar to interface 111-2. System 100b further comprises a first mirror 113b-1 at interface 111b-2 (however, first mirror 113b-1 could alternatively be located at interface 111b-2). Respective back working distances 115b-1, 115b-2 are also depicted, as are paths 117b-1a, 117b-1b and paths 117b-2a, 117b-2b and projection optics 121b.

However, system 100b further comprises third prism 101b-3 for receiving third on-state light from third DMD 103b-3 at a third entrance face 105b-3. As depicted, third entrance face 105b-3 is perpendicular to a third center-path 107b-3 of the third on-state light; however, in other implementations, third entrance face 105b-3 is off-perpendicular from third center-path 107b-3. Second prism 101b-2 hence comprises an interface 111b-3 opposite interface 111b-2, and adjacent third prism 101b-3; and third prism 101b-3 comprises an interface 111b-4 adjacent interface 111b-3, and opposite an exit face 119b of third prism 101b-3. At least one of interfaces 111b-3, 111b-4 between second prism 101b-2 and third prism 101b-3 are enabled to receive aligned first and second on-state light and the third on-state light.

System 100b further comprises a second mirror 113b-2 at one or more of interfaces 111b-3, 111b-4 (as depicted at interface 111b-4), enabled to transmit the aligned first and second on-state light through third prism 101b-3 along path 107b-1 and reflect the third on-state light in alignment with the aligned first and second on-state light back through third prism 101b-3, each of respective angles formed by a normal of second mirror 113b-2 and each of the aligned first and second on-state light and the third on-state light being less than the total internal reflection angle.

In other words, on-state light from DMD 101b-3 is in a third wavelength range different from a first wavelength range of DMD 101b-1 and a second wavelength range of DMD 101b-2, and mirror 113b-2 is enabled to transmit light from the first and second wavelength ranges and reflect light of the third wavelength range.

Third prism 101b-3 further comprises an exit face 119b which, as depicted, is perpendicular to first center-path 107b-2, but could be off-normal in other implementations.

It is further appreciated that a combination of the respective back working distances 115b-1, 115b-2, 115b-3 of, respectively, first DMD 103b-1, second DMD 103b-2 and third DMD 103b-3 and the respective shapes of each of first prism 101b-1, second prism 101b-2 and third prism 101b-2 is chosen such that the respective off-state paths and the respective illumination paths of each of first DMD 103b-1, second DMD 103b-2 and third DMD 103b-3 each of first prism 101b-1, second prism 101b-2 and third prism 101b-2 do not interfere with each other. Indeed, third prism 101b-3, angles of paths 107b-3, 117b-3a, 117b-3b, interfaces 111b-3, 111b-4, etc. are subject to the same design rules as described above.

First prism 101b-1 second prism 101b-2 and third prism 101b-3 will also be referred to hereafter collectively as prisms 101b and generically as a prism 101b. First DMD 103b-1, second DMD 103b-2 and third DMD 103b-3 will also be referred to hereafter collectively as DMDs 103b and generically as a DMD 103b.

It is appreciated that prism 101b-2 is not triangular in cross-section, but is a quadrilateral in cross-section to accommodate mirror 113b-1, entrance face 105b-2, and interface 111b-3, presuming interfaces 111b-2, 111b-3, 111b-4 are generally parallel. Prism 101b-3 is also quadrilateral to accommodate both interface 111b-4, entrance face 105b-3 and exit face 119b. In other words, application of the hereto for described design rules leads to prism 101b-2 being quadrilateral in cross-section.

It is further appreciated that respective angles formed by a normal of mirror 113b-2 and each of paths 107b-1, 107b-3, 117b-1a, 117b-3a are less than a total internal reflection angle, as described above.

It is further appreciated that respective sizes of each of faces 105b-1, 105b-2, 105b-3, interfaces 111b-1, 111b-2, 111b-3, 111b-4 and exit face 119b are commensurate with an etendue/conical shape of on-state light such that all on-state light enters and exits prisms 101b-1, 101b-2, 101b-3.

While not depicted, it is appreciated that system 100b can further comprise respective light dumps located on off-state paths of each of DMDs 103b-1, 103b-2, 103b-3, as described above.

In any event, prisms 101b combine on-state light from each of DMDs 103b which is received by projection optics 121b, for projection onto a screen, for example. In some implementations, DMDs 103b are respectively associated with red light, green light and blue light which can be combined by prisms 101b to form full colour images for projection by projection optics 121b.

While each of DMDs 103b-2, 103b-3 are located on a same side of prisms 101b, present implementations are not so limited.

Figure 6:
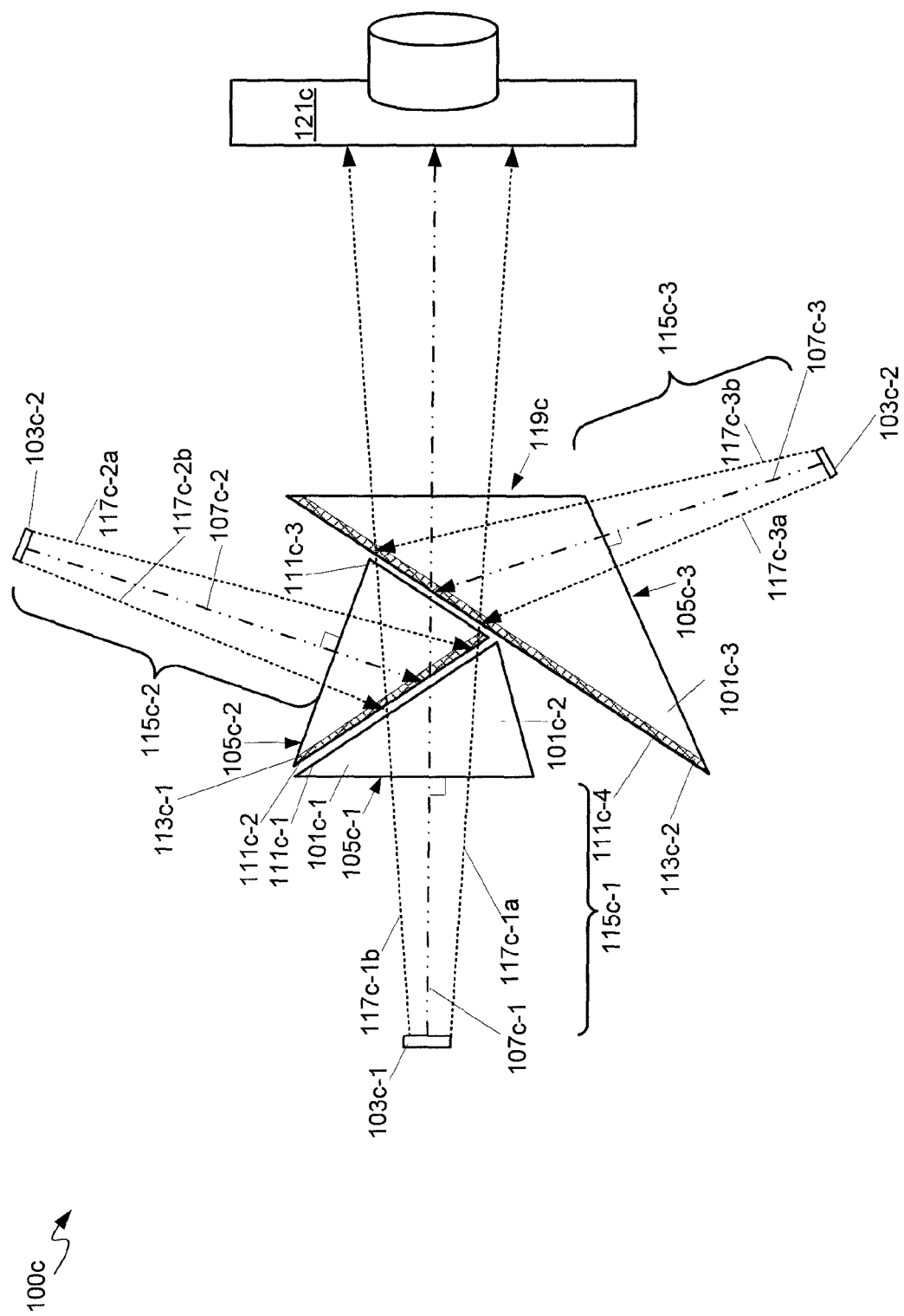
FIG. 6 depicts a light combining system with three digital micromirror devices, according to non-limiting implementations.

For example, attention is next directed to FIG. 6, which depicts a system 100c, which is substantially similar to system 100b, with like elements having like numbers, but with a "c" appended thereto rather than a "b". However, in system 100c, DMDs 103c-2, 103c-3 are located on opposite sides of prisms 101c-1, 101c-2, 101c-3.

System 100c comprises: a first prism 101c-1, a second prism 101c-2, a third prism 101c-3, a first DMD 103c-1, a second DMD 103c-2 and a third DMD 103c-3. First prism 101c-1 comprises a first entrance face 105c-1 which, as depicted, is perpendicular to a first center-path 107c-1 of first on-state light, however, in other implementations, first entrance face 105c-1 could be off-perpendicular from first center path 107c-1. Second prism 101c-2 comprises a second entrance face 105c-2 which, as depicted, is perpendicular to a second center-path 107c-2 of second on-state light, however, in other implementations, second entrance face 105c-2 could be off-perpendicular from second center path 107c-2. First prism 101c-1 further comprises an interface 111c-1, similar to interface 111b-1, and second prism 101c-2 further comprises an interface 111c-2, similar to interface 111b-2. System 100c further comprises a first mirror 113c-1 at interface 111c-2. Respective back working distances 115c-1, 115c-2 are also depicted, as are paths 117c-1a, 117c-1b and paths 117c-2a, 117c-2b and projection optics 121c.

System 100c further comprises third prism 101c-3 for receiving third on-state light from third DMD 103c-3 at a third entrance face 105c-3 which, as depicted, is perpendicular to a third center-path 107c-3 of third on-state light, however, in other implementations, third entrance face 105c-3 could be off-perpendicular from third center path 107c-3. Second prism 101c-2 hence comprises an interface 111c-3 opposite interface 111c-2, and adjacent third prism 101c-3; and third prism 101c-3 comprises an interface 111c-4 adjacent interface 111c-3, and opposite an exit face 119c of third prism 101c-3.

System 100c further comprises a second mirror 113c-2 at interface 111c-4 for transmitting the first on-state light and the second on-state light from each of DMDs 103c-1, 103c-2, respectively, through third prism 101c-2, and reflecting the third on-state light along first center-path 107c-3 through third prism 101c-3. Each of second respective angles formed by a normal of mirror 113c-2 and first center-path 107c-1, and a normal of mirror 113c-2 and third center-path 107c-3 are each less than the total internal reflection angle, as described above. Further interfaces 111c-3, 111c-4 are each on the first center-path 107c-1 and third center-path 107c-3. As depicted, an exit face 119c of third prism 101c-3 is perpendicular to first center-path 107c-1, however, in other implementations; exit face 119c could be off-perpendicular to first center-path 107c-1.

It is further appreciated that a combination of the respective back working distances 115c-1, 115c-2, 115c-3 of, respectively, first DMD 103c-1, second DMD 103c-2 and third DMD 103c-3 and the respective shapes of each of first prism 101c-1, second prism 101c-2 and third prism 101c-2 is chosen such that respective illumination paths and respective reflection paths of each of first DMD 103c-1, second DMD 103c-2 and third DMD 103c-3 do not interfere with each other, and further respective illumination paths clear each of first prism 101c-1, second prism 101c-2 and third prism 101c-2.

First prism 101c-1 second prism 101c-2 and third prism 101c-3 will also be referred to hereafter collectively as prisms 101c and generically as a prism 101c. First DMD 103c-1, second DMD 103c-2 and third DMD 103c-3 will also be referred to hereafter collectively as DMDs 103c and generically as a DMD 103c. Entrance face 105c-1, entrance face 105c-2 and entrance face 105c-2 will also be referred to hereafter collectively as entrance faces 105c and generically as an entrance face 105c. Back working distance 115c-1, back working distance 115c-2 and back working distance 115c-2 will also be referred to hereafter collectively as back working distances 115c and generically as a back working distance 115c.

In any event, in these implementations, in contrast to DMDs 103b-2, 103b-3 of system 100b, DMDs 103c-2, 103c-3 of system 100c are on opposite sides of prisms 101c. This is achieved by using different shaped prisms 101c from prisms 101b by starting with a geometry of DMDs 103c, and respective back working distances 115c, and applying previously discussed design rules. From these design rules, the shape of each of prisms 101c can be determined, as well as their respective positions in system 100c. For example, each of prisms 101c are triangular in these implementations, in contrast to prisms 101b-2, 101b-3.

It is yet further appreciated that the concepts described heretofore can be extended to light combining systems of four or more DMDs and corresponding prisms; for example, in either of systems 100b, 100c, additional prisms could be added after third prisms 101b-3, 101c-3 to receive light from additional DMDs, with additional mirrors to combine light from the DMDs, as described above.

Figure 7:
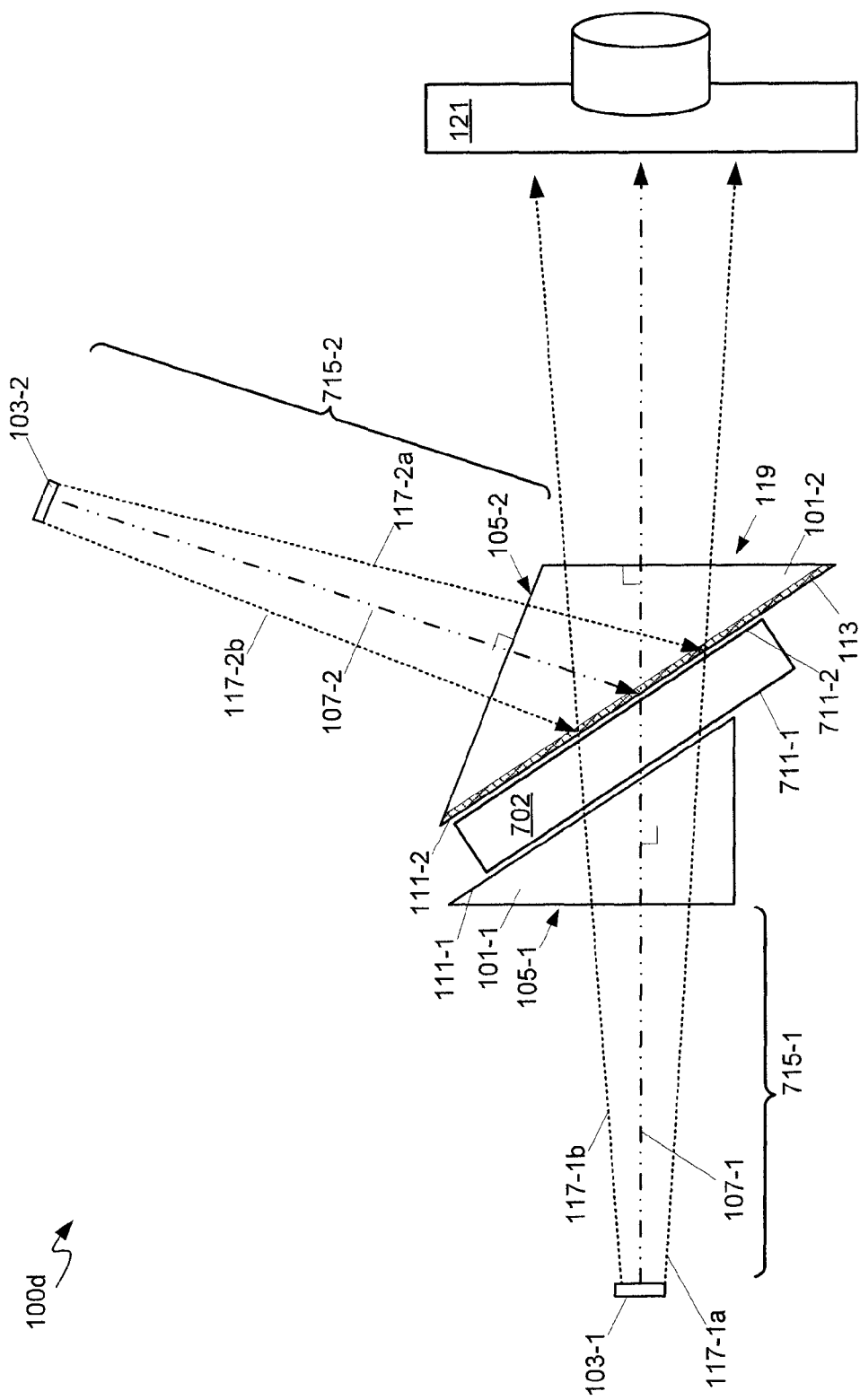
FIG. 7 depicts a light combining system with two digital micromirror devices and a spacing prism, according to non-limiting implementations.

Attention is next directed to FIG. 7, which depicts a light combining system 100d similar to system 100, with like elements having like numbers. However, located between prisms 101 is a spacing prism 702 located between prisms 101 to adjust a position of one or more or prisms 101 with respect to DMDs 103. In other words, one or more of a back working distance 715-1 of DMD 103-1 and a back working distance 715-2 of DMD 103-2 is different from respective back working distances 115 of system 100. In depicted implementations, spacing prism 702 is rectangular in cross-section with opposing faces 711-1, 711-2, respectively adjacent interfaces 111-1, 111-2, generally parallel to each other and interfaces 111. Faces 711-1, 711-2 will be interchangeable referred to hereafter, collectively, as faces 711, and generically as a face 711.

Further, in some implementations, mirror 113 could be located at face 711-2. Alternatively, mirror 113 could be located at face 711-1, presuming the geometry of prism 101-1 and spacing prism 702 could accommodate/contain paths 107, 117.

In any event, spacing prism 702 is used for separating prisms 101 to account for one or more various geometries in different projection systems into which prisms 101 are to be installed and different back working distances 715. In other words, spacing prism 702 allows a designer more flexibility in positioning prisms 101 in system 100d.

Figure 8:
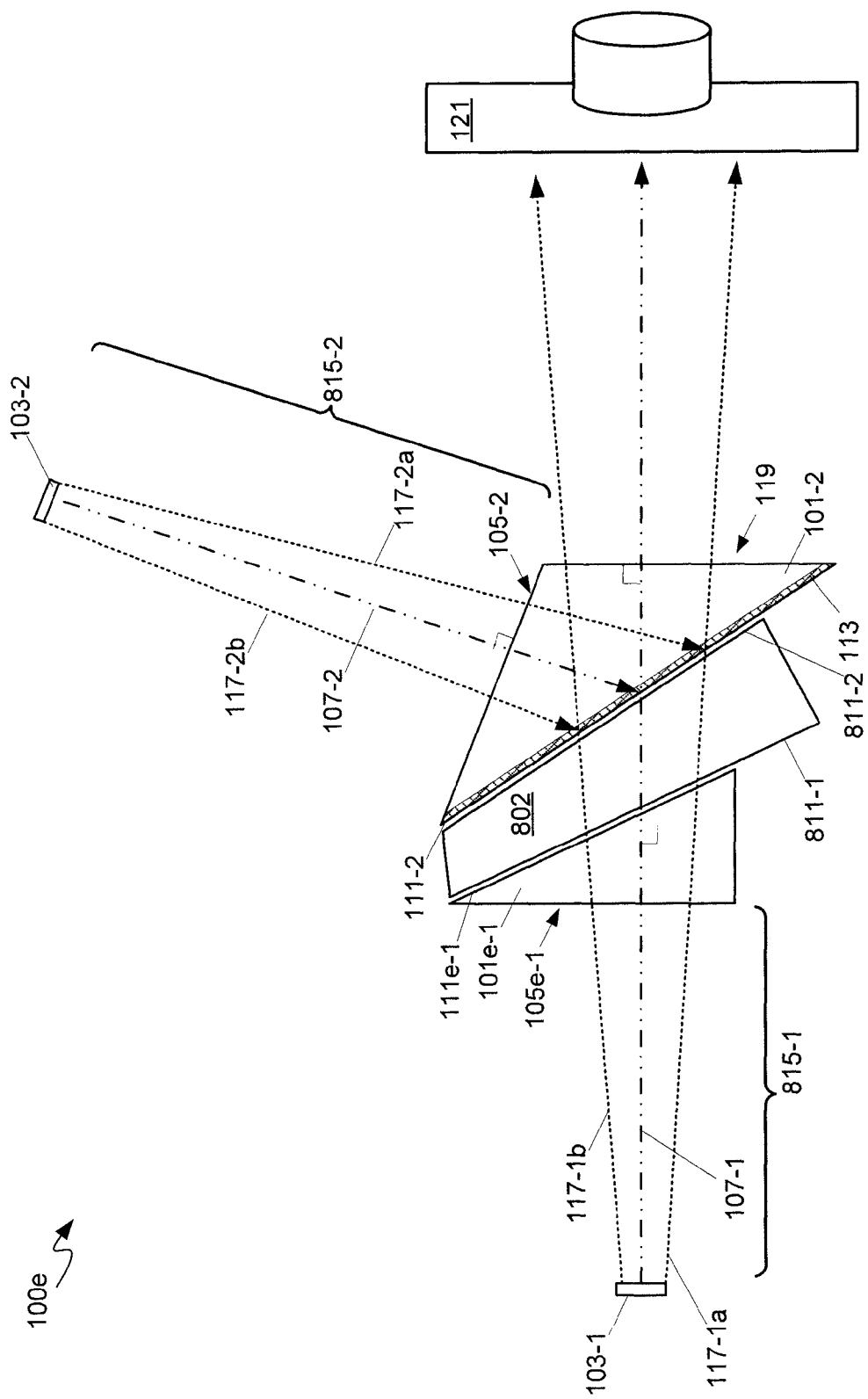
FIG. 8 depicts a light combining system with two digital micromirror devices and a spacing prism, according to non-limiting implementations.

Furthermore, spacing prism 702 need not be rectangular in cross-section. For example, attention is next directed to FIG. 8, which depicts a light combining system 100e similar to system 100, with like elements having like numbers. However, prism 101-1 has been replaced with prism 101e-1 and located between prisms 101e-1, 101-2 is a spacing prism 802 for adjusting a position of one or more or prisms 101e-1, 101-2 with respect to DMDs 103. In other words, one or more of a back working distance 815-1 of DMD 103-1 and a back working distance 815-2 of DMD 103-2 is different from respective back working distances 115 of system 100. Further, prism 101c-1 differs from prism 101-1 in that interface 111e-1 is not parallel to interface 111-2 (though entrance face 105e-1 is similar to entrance face 105-1). Hence, spacing prism 802 is quadrilateral in cross-section with opposing faces 811-1, 811-2, respectively adjacent to interfaces 111e-1, 111-2. Face 811-1 is generally parallel to interface 111e-1 to reduce internal reflection and face 8111-2 is generally parallel to interfaces 111-2, again to reduce internal reflection.

Further, in some implementations, mirror 113 could be located at face 811-2. However, in these implementations, mirror 113 could not be located at interfaced 111e-1 or face 811-1 as mirror 113 would not then be at an angle that would meet a design rule of system 100d (specifically, mirror 113 should be enabled to transmit the first on-state light through second prism 101-2 and reflect the second on-state light in alignment with the first on-state light back through second prism 101-2, each of respective angles formed by a normal of mirror 113 and each of the first on-state light and the second on-state light being less than a total internal reflection angle).

In any event, spacing prism 802 is used for separating prisms 101e-1, 101-2 to account for one or more various geometries in different projection systems into which prisms 101*e*-1, 101 are to be installed, and different back working distances 815.

Spacing prisms can also be used in light combining systems of three or more DMDs and associated prisms. For example, attention is next directed to FIG. 9, which depicts a system 100*f*, which is substantially similar to system 100*c*, with like elements having like numbers, but with an "f" appended thereto rather than a "c". System 100*f* comprises: a first prism 101*f*-1, a second prism 101*f*-2, a third prism 101*f*-3, and correspondingly a first DMD 103*f*-1, a second DMD 103*f*-2, and a third DMD 103*f*-3. First prism 101*f*-1 comprises a first entrance face 105*f*-1 that is perpendicular to a first center-path 107*f*-1 of first on-state light. Second prism 101*f*-2 comprises a second entrance face 105*f*-2 that is perpendicular to a second center-path 107*f*-2 of second on-state light. First prism 101*f*-1 comprises an interface 111*f*-1 similar to interface 111*c*-1, and second prism 101*f*-2 comprises an interface 111*f*-2 similar to interface 111*c*-2. System 100*f* further comprises a first mirror 113*f*-1 at interface 111*f*-2 (however, first mirror 113*f*-1 could alternatively be located at interface 111*f*-2). Respective back working distances 115*f*-1, 115*f*-2 are also depicted, as are paths 117*f*-1*a*, 117*f*-1*b* and paths 117*f*-2*a*, 117*f*-2*b* and projection optics 121*f*.

Figure 9:
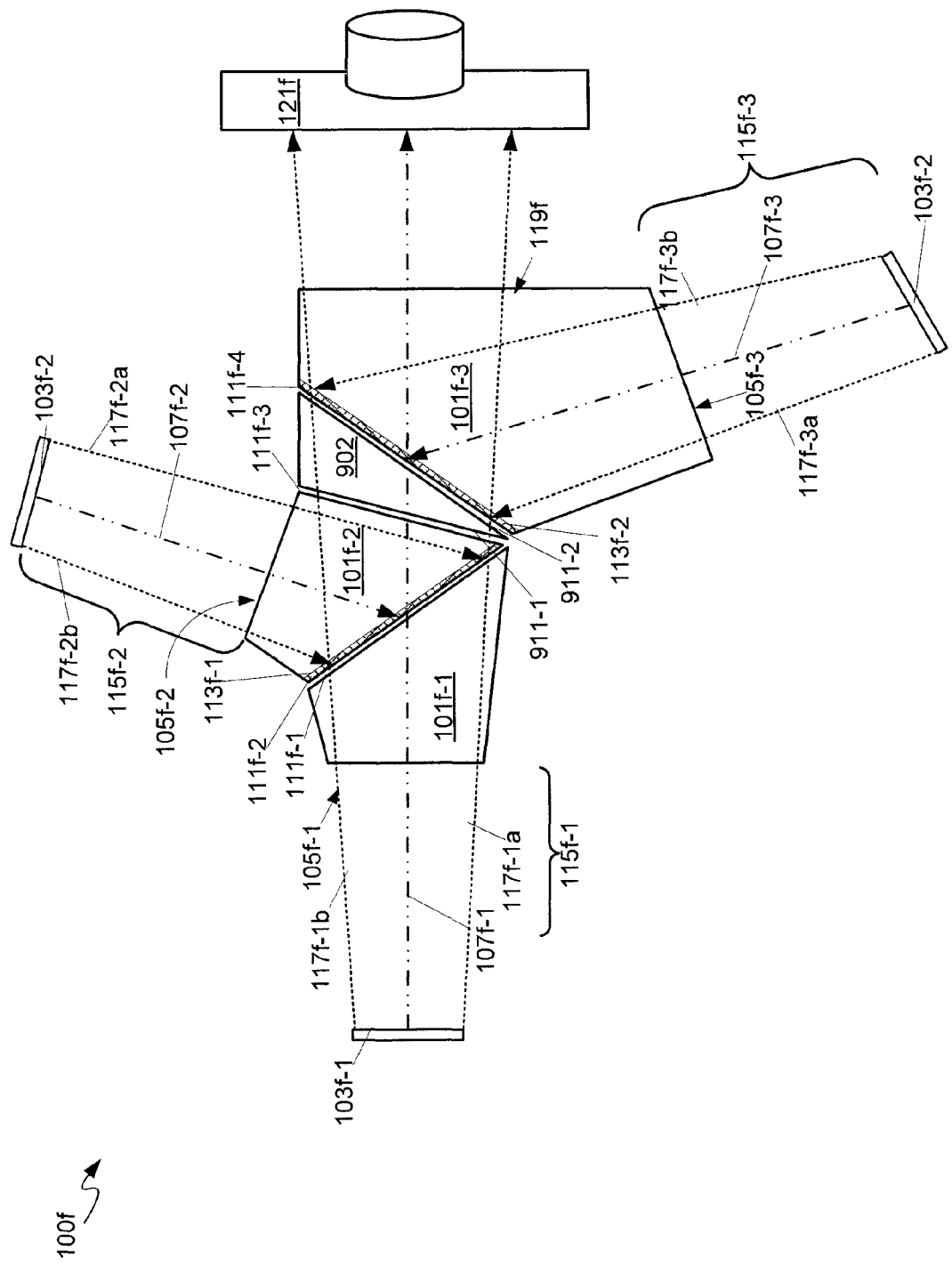
FIG. 9 depicts a light combining system with three digital micromirror devices and a spacing prism, according to non-limiting implementations.

It is further appreciated that while back working distances 115*f*-1, 115*f*-2, 115*f*-3 appear to be different lengths in FIG. 9, in other implementations, back working distances are all about the same length. Indeed, in a model of a successful prototype, all back working distances were the same length.

In any event, third prism 101*f*-3 is for receiving third on-state light from third DMD 103*f*-3 at a third entrance face 105*f*-3. As depicted, third entrance face 105*f*-3 is perpendicular to a third center-path 107*f*-3 of the third on-state light; however, in other implementations, third entrance face 105*f*-3 is off-perpendicular from third center-path 107*f*-3.

DMDs 103*f*-1, 103*f*-2, 103*f*-3 will be interchangeably referred to hereafter as DMDs 103*f*; entrance faces 105*f*-1, 105*f*-2, 105*f*-3 will be interchangeably referred to hereafter as entrance faces 105*f*. In any event, it is appreciated that, compared to DMDs 103, a lateral dimension DMDs 103*f* is only a little smaller than respective entrance faces 105*f*. The effect on system 100*f* is that path 117*f*-1*b* just barely clears exit face 119*f*.

However, in these implementations, system 100*f* further comprises a spacing prism 902 between prisms 101*f*-2, 101*f*-3, prism 902 being triangular in cross-section, in contrast to spacing prisms 702, 802. Prism 902 comprises faces 911-1, 911-2.

Second prism 101*f*-2 hence comprises an interface 111*f*-3 adjacent face 911-1, and third prism 101*f*-3 comprises an interface 111*f*-4 adjacent face 911-2, and opposite an exit face 119*f* of third prism 101*f*-3. At least one of interfaces 111*f*-3, 111*f*-4, and faces 911-1, 911-2 between second prism 101*f*-2 and third prism 101*f*-3 are enabled to receive aligned first and second on-state light and the third on-state light.

System 100*f* further comprises a second mirror 113*f*-2 at one or more of face 911-2 and interface 111*f*-4 (as depicted, at interface 111*f*-4), enabled to transmit the aligned first and second on-state light through third prism 101*f*-3 along path 107*f*-1 and reflect the third on-state light in alignment with the aligned first and second on-state light back through third prism 101*f*-3, each of respective angles formed by a normal of second mirror 113*f*-2 and each of the aligned first and second on-state light and the third on-state light being less than the total internal reflection angle, as described above.

Third prism 101*f*-3 further comprises an exit face 119*f* which, as depicted, is perpendicular to first center-path 107*f*-2, but could be off-normal in other implementations.

It is further appreciated that a combination of the respective back working distances 115*f*-1, 115*f*-2, 115*f*-3 of, respectively, first DMD 103*f*-1, second DMD 103*f*-2 and third DMD 103*f*-3 and the respective shapes of each of first prism 101*f*-1, second prism 101*f*-2, third prism 101*f*-2 and spacing prism 902 is chosen such that the respective off-state paths and the respective illumination paths of each of first DMD 103*f*-1, second DMD 103*f*-2 and third DMD 103*f*-3 of each of first prism 101*f*-1, second prism 101*f*-2 and third prism 101*f*-2 do not interfere with each other. Indeed, third prism 101*f*-3, angles of paths 107*f*-3, 117*f*-3*a*, 117*f*-3*f*, interfaces 111*f*-3, 111*f*-4, etc. are subject to the same design rules as described above.

In other words, spacing prism 902 enables more flexibility in designing system 100*f* to account for different geometries in different projection systems into which system 100*f*, and the like, are positioned. For example, due to the geometries/relative sizes of DMDs 103*f* and entrance faces 105*f*, as well as geometries of prisms 101*f*-1, 101*f*-2, 101*f*-3, light path 117*f*-1*b* barely clears exit face 119*f*: if spacing prism 902 were not present to adjust the geometry of system 100*f*, light path 117*f*-1*b* could hit the top surface of prism 101*f*-3 causing reduced throughout and scatter in system 100*f*.

Further, none of prism 101*f*-1, 101*f*-2, 101*f*-3 are triangular in cross-section; rather prisms 101*f*-1, 101*f*-2 are quadrilateral in cross-section and prism 101*f*-3 is pentagonal in cross-section. While, prism 101*f*-2 and spacing prism 902 could be replaced by a prism having the same shape as a combination of prism 101*f*-2 and spacing prism 902, such a prism would have a complicated shape and could be more difficult to polish than individually polishing second prisms 101*f*-2 and spacing prism 902.

Further, while spacing prism 902 is triangular in cross-section, spacing prism 902 could be any suitable shape. Further, in some implementations, mirror 113*f*-2 could be located at face 911-2. However, in these implementations, mirror 113*f*-2 could not be located at interfaced 111*f*-1 or face 911-1 as mirror 113*f*-2 would not then be at an angle that would meet a design rule of system 100*f* (specifically, mirror 113*f*-2 should be enabled to transmit the aligned first and second on-state light through third prism 101*f*-3 and reflect the third on-state light in alignment with the aligned first and second on-state light back through third prism 101*f*-3, each of respective angles formed by a normal of mirror 113*f*-2 and each of the aligned first and second on-state light and the third on-state light being less than a total internal reflection angle).

It is yet further appreciated that system 100*f* represents a successful model of a prototype with an air-gap between each prism 101*f*-1, 101*f*-2, 101*f*-3, 902 of about 0.025 mm and a tolerance of about +0.010 mm/−0.002 mm, and horizontal distance between entrance face 105*f*-1 and exit face 119*f* of about 145 mm. However, such dimensions are not to be considered particularly limiting.

In any event, spacing prism 902 is used for separating prisms 101*f*-2, 101*f*-3 to account for one or more various geometries in different projection systems into which prisms 101*f*-1, 101*f*-2, 101*f*-3 are to be installed, and different back working distances 115*f*-1, 115*f*-2, 115*f*-3, to improve efficiency of system 100*f*.

In any event, by providing a light combining system of prisms, as described above, the following advantages are realized:

No illumination light, off-state light or total internal reflection occurs within the prisms of light combining systems of present implementations; therefore no scatter from these sources occurs.

No off-state light hits the side of the prisms of light combining systems of present implementations; therefore no scatter from stray off-state light occurs.

Prisms can be smaller than prior art systems for combining light because only on-state needs to be accommodated. Further, prism can be shorter in height because the DMD is rotationally orthogonal to the prism (e.g. no need to have the glass at 45° to accommodate an illumination path).

No total internal reflections to cause red shift.

Mirrors are single pass dichroic mirrors (i.e. one transmission, one reflection), hence their design and specification are simpler over prior art dichroic mirrors, and their angle of incidence (AOI) requirements are also lowered.

No angled or asymmetric dichroic plates needed.

No illumination total internal reflection prism required, which leads to a reduced parts count.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A light combining system comprising:
   a first prism comprising a first entrance face enabled to receive first on-state light from a first DMD (digital micromirror device);
   a second prism comprising a second entrance face enabled to receive second on-state light from a second DMD;
   at least one interface between the first prism and the second prism enabled to receive the first on-state light and the second on-state light; and,
   a mirror at the at least one interface, enabled to transmit the first on-state light through the second prism and reflect the second on-state light in alignment with the first on-state light back through the second prism, each of respective angles formed by a normal of the mirror and each of the first on-state light and the second on-state light being less than a total internal reflection angle;
   a combination of respective back working distances of the first DMD and the second DMD and respective shapes of each of the first prism and the second prism selected such that:
      respective illumination paths and respective reflection paths of each of the first DMD and the second DMD do not interfere with each other,
      the respective illumination paths do not intersect the first prism and the second prism; and
      respective off-state paths of the first DMD and the second DMD do not intersect the first prism and the second prism.

2. The light combining system of claim 1, wherein the first entrance face is about perpendicular to a first center-path of the first on-state light, the second entrance face is about perpendicular to a second centre-path of the second on-state light and an exit face of the second prism is about perpendicular to the first center-path.

3. The light combining system of claim 1, wherein respective further angles between the mirror and each of the first entrance face and the second entrance face are each less than the total internal reflection angle.

4. The light combining system of claim 1, further comprising an air-gap between the first prism and the second prism, the at least one interface at the air-gap.

5. The light combining system of claim 4, further comprising a harness enabled to hold the first prism and the second prism to maintain a distance of the air-gap.

6. The light combining system of claim 5, further comprising one or more spacers between the first prism and the second prism to maintain a distance of the air-gap.

7. The light combining system of claim 1, further comprising an optical epoxy between the first prism and the second prism.

8. The light combining system of claim 1, wherein the mirror comprises one or more of a coating on the at least one interface and a dichroic mirror.

9. The light combining system of claim 1, wherein faces of the first prism and the second prism through which the first on-state light and the second on-state light travel through, other than the at least one interface, are coated with respective antireflective coatings.

10. The light combining system of claim 1, further comprising the first DMD and the second DMD.

11. The light combining system of claim 1, further comprising projection optics enabled to receive the first on-state light and the second on-state light when the first on-state light and the second on-state light exit the second prism.

12. The light combining system of claim 1, further comprising respective light dumps for absorbing respective off-state light of the first DMD and the second DMD.

13. The light combining system of claim 1, wherein at least one of the respective shapes of the first prism and the second prism is triangular in cross-section.

14. The light combining system of claim 1, further comprising at least one spacing prism between the first prism and the second prism.

15. The light combining system of claim 1, further comprising:
   a third prism comprising a third entrance face enabled to receive third on-state light from a third DMD;
   at least one second interface between the second prism and the third prism enabled to receive aligned first and second on-state light and the third on-state light; and,
   a second mirror at the at least one second interface, enabled to transmit the aligned first and second on-state light through the third prism and reflect the third on-state light in alignment with the aligned first and second on-state light back through the third prism, each of respective angles formed by a normal of the second mirror and each of the aligned first and second on-state light and the third on-state light being less than the total internal reflection angle;
   a combination of the respective back working distances of the first DMD, the second DMD and the third DMD and the respective shapes of each of the first prism, the second prism and the third prism selected such that:
      respective off-state paths and the respective illumination paths and the respective reflection paths of each of the first DMD, the second DMD and the third DMD do not interfere with each other;
      the respective illumination paths do not intersect the first prism, the second prism, and the third prism; and
      the respective off-state paths do not intersect the first prism, the second prism and the third prism.

16. The light combining system of claim 1, wherein each of the first on-state light and the second on-state light comprises cones, and the respective angles formed by the normal of the mirror and edges of each of the cones are each less than the total internal reflection angle.

* * * * *